US009568744B2

(12) United States Patent
Pugh et al.

(10) Patent No.: US 9,568,744 B2
(45) Date of Patent: Feb. 14, 2017

(54) SYSTEM AND METHOD OF PROGRAMMING AN ENERGIZED OPTHALMIC LENS

(71) Applicant: Johnson & Johnson Vision Care, Inc., Jacksonville, FL (US)

(72) Inventors: Randall B. Pugh, Jacksonville, FL (US); Frederick A. Flitsch, New Windsor, NY (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 14/834,154

(22) Filed: Aug. 24, 2015

(65) Prior Publication Data

US 2015/0362748 A1   Dec. 17, 2015

Related U.S. Application Data

(62) Division of application No. 13/896,643, filed on May 17, 2013, now Pat. No. 9,116,363.

(51) Int. Cl.
*G02C 7/02* (2006.01)
*G02C 7/00* (2006.01)
*G02C 7/04* (2006.01)
*G02C 7/08* (2006.01)

(52) U.S. Cl.
CPC .............. *G02C 7/027* (2013.01); *G02C 7/028* (2013.01); *G02C 7/041* (2013.01); *G02C 7/085* (2013.01)

(58) Field of Classification Search
USPC .......................... 351/159.01, 159.39, 159.03, 159.04, 351/159.05, 159.68
See application file for complete search history.

(56) References Cited

U.S. PATENT DOCUMENTS

| 7,503,652 | B2 | 3/2009 | Menezes |
| 8,292,953 | B2 | 10/2012 | Weeber et al. |
| 8,690,319 | B2 | 4/2014 | Menezes |
| 9,316,848 | B2 * | 4/2016 | Pugh ...................... G02C 7/048 |
| 2005/0254006 | A1 | 11/2005 | Dai et al. |
| 2010/0079724 | A1 | 4/2010 | Pugh et al. |
| 2014/0268033 | A1 * | 9/2014 | Pugh ...................... G02C 7/048 351/159.73 |
| 2014/0340630 | A1 * | 11/2014 | Pugh .................... A61B 5/1103 351/158 |

FOREIGN PATENT DOCUMENTS

WO   WO 2010051225 A1   5/2010

OTHER PUBLICATIONS

PCT Written Opinion for PCT Int'l Appln. No. PCT/US2014/037858.
PCT International Search Report for PCT/US2014/037858 Dated: Sep. 30, 2014.

* cited by examiner

*Primary Examiner* — Joseph P Martinez
*Assistant Examiner* — Brandi Thomas

(57) ABSTRACT

A method and a system for the selection and programming of an energized ophthalmic lens are disclosed. More specifically, the energized ophthalmic lens which can include a variable state arcuate shaped liquid meniscus lens capable of changing vision correction properties upon the receipt of an activation signal. According to some aspects of the disclosure, the system and method comprise vision simulation software configured to use patient's eye related data and product design options to select the ophthalmic lens and an operational protocol for the change of optical properties.

20 Claims, 7 Drawing Sheets

SYSTEM AND METHOD OF PROGRAMMING AN ENERGIZED OPTHALMIC LENS

CROSS-REFERENCE TO RELATED APPLICATION

This application is a divisional of, and claims priority to, U.S. patent application Ser. No. 13/896,643, filed May 17, 2013, published Nov. 20, 2014, as US2014-0340632, the entire contents of which are hereby incorporated by reference.

TECHNICAL FIELD

The disclosure generally relates to an energized ophthalmic lens and, more particularly, relates to a system for programming multi-focal vision correction parameters of the ophthalmic lens.

BACKGROUND

Traditionally, ophthalmic devices, such as a hydrogel lens, an intraocular lens or a punctal plug, include corrective, cosmetic or therapeutic qualities. A contact lens, for example, may provide vision correcting functionality, cosmetic enhancement, and/or therapeutic effects. Each function is provided by a physical characteristic of the contact lens. For example, a refractive quality may provide a vision corrective function, a pigment may provide a cosmetic enhancement, and an active agent may provide a therapeutic functionality.

Liquid meniscus lenses have been known in various industries. Known liquid meniscus lenses have been engineered in cylindrical shapes with a perimeter surface formed by points at a fixed distance from an axis which is a straight line. Known liquid meniscus lenses have been limited to designs with a first interior surface generally parallel to second interior surface generally parallel to second interior and each perpendicular to a cylindrical axis. Known examples of the use of liquid meniscus lenses include devices such as electronic cameras and mobile phone devices.

More recently, U.S. patent application Ser. No. 13/095,786, titled "Arcuate Liquid Meniscus Lens", assigned to the same inventive entity of the present disclosure, teaches an arcuate liquid meniscus lens suitable for a contact lens. In addition, as microelectronics continue to be developed, size, shape and control limitations can allow for active energized components to be incorporated in ophthalmic lenses in useful manners. As previously mentioned, currently available contact lenses are capable of providing vision correction through a physical characteristic of the contact lens. However, many individuals require the use of bi-focal or tri-focal lenses in order to provide the vision correction needed for vision at different distances. With the use of microelectronics and variable liquid meniscus lenses having geometries that can be suitable to be placed on the surface of an eye, new programming and design methods and systems that can be useful to provide variable vision correction are desired.

Therefore, there is a need for ophthalmic lenses and systems that can incorporate electronic and active vision correction components that can be configured to provide multi-focal vision correction.

SUMMARY OF THE INVENTION

Accordingly, the foregoing needs are met, to a great extent, by one or more embodiments of the systems and method disclosed herein. In accordance with some embodiments, the system for providing multi focal vision correction to a patient can include an energized ophthalmic lens comprising a media insert and a hydrogel portion. The hydrogel portion can support, and in some embodiments encapsulate, the media insert encapsulating one or both of: a battery and an arcuate shaped liquid meniscus lens. A communication system can be in logical electrical connection with a microprocessor of the ophthalmic lens and be configured to wirelessly receive data from a refraction examination of a user. In some embodiments, the microprocessor can be supported by the media insert and is configured to change the shape of the liquid meniscus of said arcuate shaped liquid meniscus lens from a first state to a second state according to a programmed signal being based on an input from a user and the wirelessly received data from the refraction examination. The geometry of the ophthalmic lens of the system being at least partially defined by a topographical examination and capable of correcting distance vision deficiencies when the liquid meniscus of said arcuate shaped liquid meniscus lens is at a first state. A change of the shape of the liquid meniscus of said arcuate shaped liquid meniscus lens from a first state to a second state which may be useful to correct near sight deficiencies of the user. Similarly, the change from one state to another may be used to correct for distance vision deficiencies. In some embodiments, no optical correction may occur at the first state. When this is the case, only distance vision or near sight vision correction can occur on demand.

According to additional aspects of the disclosure, a method of programming an energized ophthalmic lens for providing multi-focal vision correction is disclosed. The method comprising: determining vision corrective needs of a user for distance X; determining vision corrective needs of a user for distance Y; obtaining at least one bare eye data measurement and visional correction properties of at least one lens design; providing a simulated display of graphical representations predicting the optical effect of one or more ophthalmic lenses; selecting from the simulated display an ophthalmic lens comprising a hydrogel supporting structure and a Media Insert, at least a portion of the Media Insert being supported by the hydrogel portion, and positioned onto a portion of the optical zone of the ophthalmic lens, the shape of the ophthalmic lens providing an optical effect capable of correcting the vision at a distance X; and programming an operational protocol to switch the state of the optical corrective properties of the lens to correct the deficiencies for an image at distance Y.

Certain implementations and configurations of the systems and method steps have been outlined so that the detailed description below may be better understood. There are, of course, additional implementations that will be described below and which will form the subject matter of the claims.

In this respect, before explaining at least one implementation in detail, it is to be understood that the hydrogel lens including the communication system is not limited in its application to the details of construction and to the arrangements of the components set forth in the following description or illustrated in the drawings. Also, it is to be understood that the phraseology and terminology employed herein, as well as in the Abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the ophthalmic lens including the control, subsequent to the manufacturing of the ophthalmic lens, of additional dynamic components that may be included in some embodiments. It is understood, therefore, that the claims include such equivalent constructions insofar as they do not depart from the spirit and scope of the present application.

DETAILED DESCRIPTION OF THE INVENTION

Figure 1:
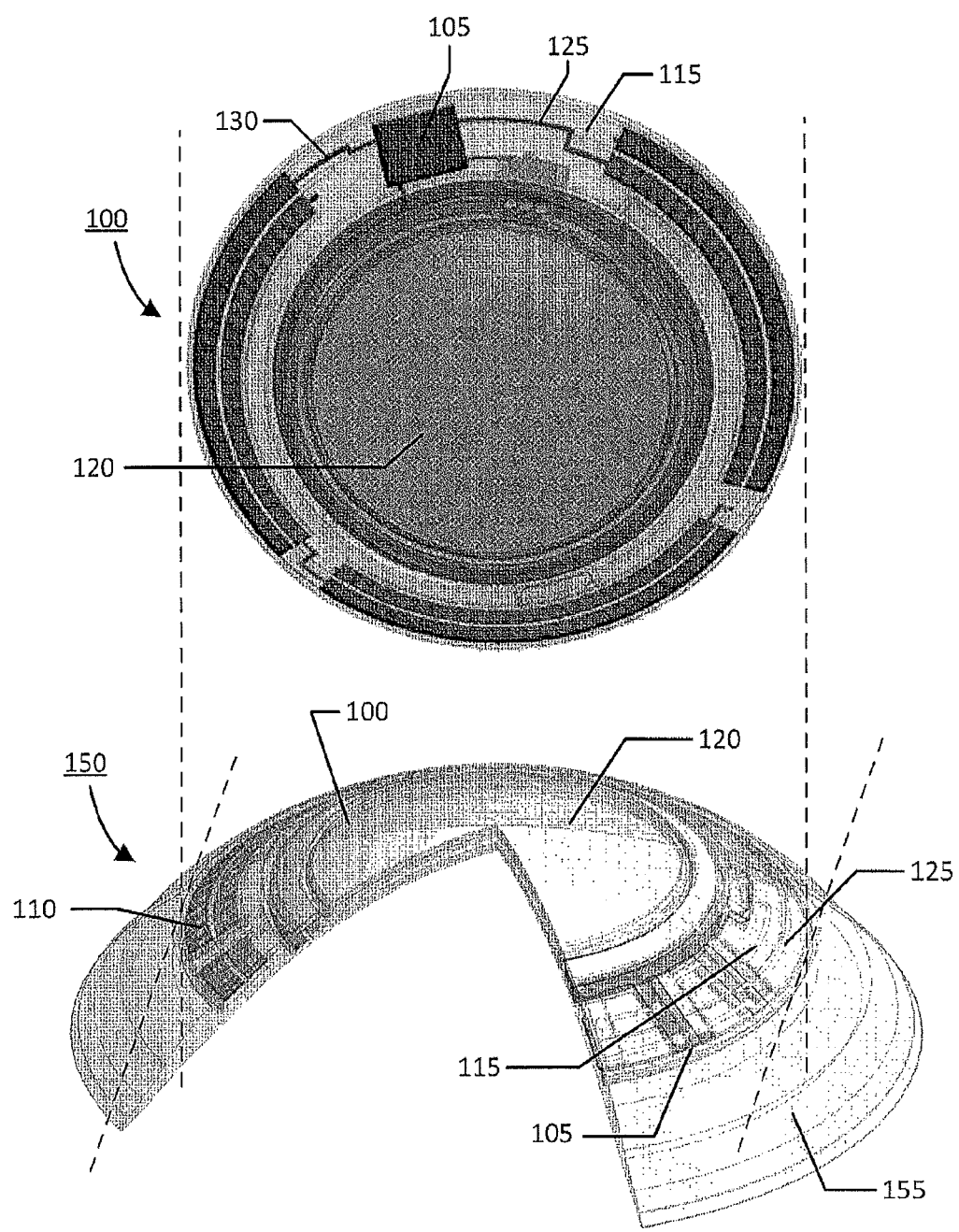
FIG. 1 illustrates a top view of an exemplary Media Insert 100 for an energized Ophthalmic Device 150 and an isometric representation of the energized Ophthalmic Device 150 with two partial cross sections.

A method and system useful to provide multi-focal vision correction to a user is disclosed. The system may be used to program vision corrective properties at more than one state using an Energized Ophthalmic Lens in a sensible manner. According to some aspects, the system can include an active lens insert comprising an electro-active arcuate shaped liquid meniscus lens capable of changing a first state to a predetermined second vision correction state upon a signal from the user.

Glossary

In the description and the claims, various terms may be used for which the following definitions will apply:

Active Lens Insert: as used herein, may refer to an electronic or electromechanical insert device with controls based upon logic circuits.

Bare Eye Data: as used herein, may refer to data and information taken of a patient's eye when the patient is not using any vision correction devices. A series of exams can be performed to collect bare eye data, including, e.g., a physiology exam, a topographical exam, a wavefront exam, and a refraction exam.

Communication System: as used herein, may refer to a wireless communication device that can be configured to transmit and receive electromagnetic radiation from its components. In some embodiments, the communication system can include a nano-antenna, such as a nano-fractal antenna or a nano-yagi-uda type of antenna architecture, and a nano-scale sensor, processor and nano-transceiver. In some embodiments, the communication system can be of negligible size and be without consequence in most optical plastic polymer or resin applications. In alternative embodiments, significantly opaque components of larger communication systems that would impede vision may be positioned outside of the optical zone, for example, forming part of a Media Insert.

Energized: as used herein, may refer to the state of being able to supply electrical current to or to have electrical energy stored within.

Energy Receptor: as used herein, may refer to a medium that can functions as an antenna for receiving wireless energy, such as, for example via radio wave transmission.

Energy Source: as used herein, may refer to device or layer which is capable of supplying Energy or placing a logical or electrical device in an Energized state.

Energy: as used herein, may refer to the capacity of a physical system to do work. Many uses within this disclosure may relate to the said capacity being able to perform electrical actions in doing work.

Fitting Lens Data: as used herein, may refer to data and information taken of a patient's eye when the patient is using a fitting lens vision correction device. A series of exams can be performed to collect fitting lens data, including, e.g., a physiology exam, a topographical exam, a wavefront exam, and a refraction exam.

Functionalized Layer Insert: as used herein, may refer to an insert for an ophthalmic device formed from multiple functional layers from which at least a portion of the multiple functional layers are stacked. The multiple layers may have unique functionality for each layer; or alternatively mixed functionality in multiple layers. In some embodiments, the layers can be rings.

Habitual Lens: as used herein, may refer to a lens worn by the patient on a regular basis, e.g., daily.

Habitual Lens Data: as used herein, may refer to data and information taken of a patient's eye when the patient is using a habitual lens vision correction device. A series of exams can be performed to collect habitual lens data, including, e.g., a physiology exam, a topographical exam, a wavefront exam, and a refraction exam.

Lens Design: as used herein, may refer to form, function and/or appearance of a desired Lens which may provide functional characteristics comprising but not limited to optical power correction, color appearance, therapeutic functionality, wearability, acceptable permeability, shape, composition, conformability, acceptable lens fit (e.g., corneal coverage and movement), and acceptable lens rotation stability.

Lens Forming Mixture: as used herein, the term "lens forming mixture" or "Reactive Mixture" or "RMM" (reactive monomer mixture) refers to a monomer or prepolymer material which can be cured and crosslinked or crosslinked to form an Ophthalmic Lens. Various embodiments can include lens forming mixtures with one or more additives such as: UV blockers, tints, photoinitiators or catalysts, and other additives one might desire in an ophthalmic lenses such as, contact or intraocular lenses.

Mechanical Choices as used herein, can refer to those choices that are visible or tangible. Mechanical choices may include base curve, diameter, center thickness, and stabilization profiles.

Media Insert: as used herein, may refer to a formable or rigid substrate capable of supporting an energization element, such as a battery, within an ophthalmic lens. In some embodiments, the media insert also includes one or more variable optic lenses and communication systems.

Metrology: as used herein, may refer to both theoretical and practical aspects of measurement and "metrology equipment" includes equipment capable of measuring optical and material characteristics of materials.

Mold: as used herein, may refer to a rigid or semi-rigid object that may be used to form lenses from uncured formulations. Some molds can include one or more mold parts used to form a hydrogel lens comprising raised portions.

Ocular Surface: as used herein, may refer to an anterior surface area of the eye.

Ophthalmic Lens: as used herein, may refer to any ophthalmic device that resides in or on the eye. These devices can provide optical correction or may be cosmetic. For example, the term lens can refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the disclosure are soft contact lenses are made from silicone elastomers or hydrogels, which include but are not limited to silicone hydrogels, and fluorohydrogels.

Optical Choices: as used herein, may refer to those choices most beneficial to improving a patient's vision. Optical choices may include low order optical aberration correction (e.g., 2nd order, 3rd order), custom low to mid order optical aberration correction (e.g., 4th order, 5th order), and custom mid to high order optical aberration correction (e.g., 6th order, 7th order).

Optical Zone: as used herein, may refer to an area of an ophthalmic device or lens through which a wearer of the ophthalmic lens sees after the lens is formed.

Pedigree Profile: as used herein, may refer to the background and/or manufacturing history of an ophthalmic lens. In some preferred embodiments, the pedigree profile can include, for example, one or more of: lens corrective specifications, base curve, material(s), encrypted digital identification data, manufacturing facility information, and authentication data.

Peripheral Zone: as used herein, the term "peripheral zone" or "non-optic zone" may refer to an area of an ophthalmic lens outside of the optic zone of the ophthalmic lens, and therefore outside of a portion of the ophthalmic lens through which a lens wearer sees while wearing the ophthalmic lens on, near or in the eye in a normally prescribed fashion.

Physiology Exam: as used herein, may refer to an exam that observes the physical appearance of the eye. Physiology exam includes, but is not limited to, a glaucoma test (e.g., tonometry test, ophthalmoscopy, optic nerve computer imaging techniques, etc.), a retinal exam (e.g., ophthalmoscopy, papillary dilation test, optomap retinal exam, etc.), checking for ulcers, a tear production test to check for dry eye syndrome (e.g., Schirmer test), checking for eye infections, etc.

Refraction Exam: as used herein, may refer to an exam wherein a patient's vision is refracted using a device that contains hundreds of combinations of lenses to determine any possible refractive error such as nearsightedness, farsightedness, astigmatism, or presbyopia. An over-refraction exam is where a similar exam is taken but with the patient wearing a contact lens.

Software-Based: as used herein, may refer to an interaction to reach information contained, formulated, and delivered with devices in which one or more are electric or electronic in construction and require software code for operation. The software can be locally installed into one or more devices or remotely located.

Store-Based: as used herein, may refer to an interaction between the patient and information utilizing devices or information source elements occurring at the point of purchase (e.g., practitioner's office, pharmacy, retail store, on-line, kiosk, mobile van, etc.).

Topographical Exam: as used herein, may refer to an exam that looks at the surface features of an eye. Topographical exam includes, but is not limited to, curvature of a cornea and surface of a retina, which may help in determining certain characteristics such as: base curve measurement of a patient's eye, limbal measurements, pupil size, line of sight measurement, pupil center measurement, geometric center measurement, etc.

Wavefront Exam: as used herein, can refer to an exam that looks at the way that the light travels in an eye. A wavefront exam, which may be performed with an aberrometer, creates an optical aberration map, which is sometimes called an "optical fingerprint", and identifies optical aberrations or distortions of a patient's eye (e.g., low order, medium order, high order, Zernike, other functions or descriptors, etc.). Examples of low order optical aberrations include nearsightedness, farsightedness, and astigmatism. Examples of high order optical aberrations include coma, trefoil, and spherical aberration.

Web-Based as used herein, can refer to an interaction between a practitioner and/or a patient and information based on communication, either in near real time or by delayed transmission, between two points, in which this connection uses in part the Internet, commonly referred to as the World-Wide-Web, where a practitioner and/or a patient is at one of the points. The practitioner and/or the patient located point can be a store or non-store location (i.e., home or office) for such a web-based interaction.

Referring now to FIG. 1, a top view of an exemplary Media Insert 100 for an energized ophthalmic device and an isometric exemplary energized Ophthalmic Device 150 with two partial cross sections are depicted. The Media Insert 100 may comprise an active Optical Zone 120 that may be functional to provide vision correction at more than one state. In some embodiments, the Media Insert 100 may include a portion not in the Optical Zone 120 comprising a substrate 115 incorporated with energization elements 110 and electronic components 105.

In some embodiments, a power source 110, which may be, for example, a battery, and a load 105, which may be, for example, a semiconductor die, may be attached to the substrate 115. Conductive traces 125 and 130 may electrically interconnect the electronic components 105 and the energization elements 110. In some embodiments, the Media Insert 100 can be fully encapsulated to protect and contain the energization elements 110, traces 125 and 130, and electronic components 105. In some embodiments, the encapsulating material may be semi-permeable, for example, to prevent specific substances, such as water, from entering the Media Insert 100 and to allow specific substances, such as ambient gasses, fluid samples, and/or the byproducts of reactions within energization elements 110, to penetrate and/or escape from the Media Insert 100.

In some embodiments, the Media Insert 100 may be included in/or on Ophthalmic Lens 150, which may comprise a polymeric biocompatible material. The Ophthalmic Lens 150 may include a rigid center, soft skirt design wherein a central rigid optical element comprises the Media Insert 100. In some specific embodiments, the Media Insert 100 may be in direct contact with the atmosphere and the corneal surface on respective anterior and posterior surfaces, or alternatively, the Media Insert 100 may be encapsulated in the Ophthalmic Lens 150. The periphery 155 of the Ophthalmic Device 150 may be a soft skirt material, including, for example, a hydrogel material. The hydrogel material which include a silicone containing component. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

Other silicone containing components suitable for use in this disclosure include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes can also be used as the silicone containing component in this disclosure.

In some embodiments, the infrastructure of the Media Insert 100 and the Ophthalmic Device 150 may provide an environment to perform analysis of ocular fluid while in contact with an ocular surface according to aspects of the present invention. Ocular fluid samples can include any one, or a combination of: tear fluid, aqueous humour, vitreous humour, and other interstitial fluids located in the eye.

Figure 2A:
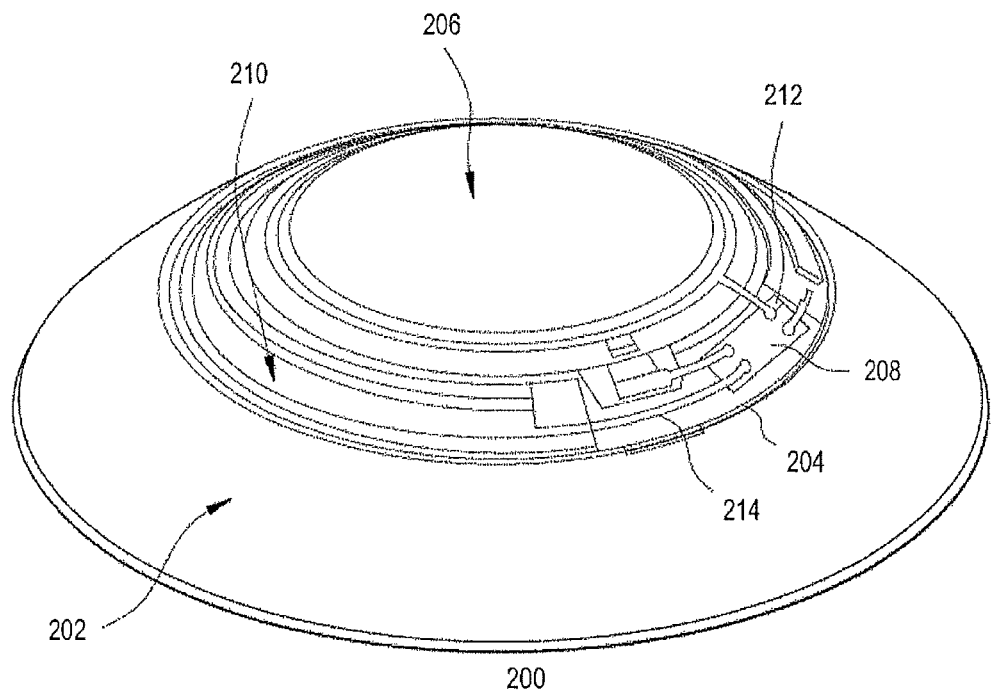
FIG. 2A is a diagrammatic representation an exemplary Energized Ophthalmic Lens in accordance with aspects of the present disclosure.

Referring now to FIG. 2A, a diagrammatic representation of another exemplary Energized Ophthalmic Lens 200 in accordance with aspects of the present disclosure is illustrated. The exemplary Energized Ophthalmic Lens 200 may comprise a soft plastic and/or hydrogel portion 202 which can support, and in some embodiments, encapsulate the Media Insert 204. According to aspects of the present disclosure, the Media Insert 204 can include an arcuate shaped liquid meniscus lens 206 which may be activated by the electronics, for example, focusing an image near or far depending on activation.

Integrated circuit 208 can mount onto a surface of the Media Insert 204 and connect to Energy Source 210 (e.g. batteries), lens 206, and other components as necessary for the system. The integrated circuit 208 can include a photosensor 212 and associated photodetector signal path circuits. The photosensor 212 may face outward through the lens insert and away from the eye, and is thus able to receive ambient light. The photosensor 212 may be implemented on the integrated circuit 208 (as shown) for example as a single photodiode or array of photodiodes. The photosensor 212 may also be implemented as a separate device mounted on the Media Insert 204 and connected with wiring traces 214.

In some embodiments, an activation signal for a change of state of the arcuate shaped liquid meniscus lens 206 may result from a user blinking. When the eyelid closes, the Media Insert 204 including photosensor 212 is covered, thereby reducing the light level incident on the photosensor 212. The photosensor 212 is able to measure the ambient light to determine when the user is blinking. In some embodiments including the blink detection system, an algorithm can be implemented that may allow for more variation in the duration and spacing of the blink sequence to identify activation signals from the user. For example, by timing the start of a second blink based on the measured ending time of a first blink rather than by using a fixed template or by widening the mask "don't care" intervals (0 values).

It will be appreciated that the blink detection algorithm may be implemented in digital logic or in software running on the processor of the system controller 210. The algorithm logic or system controller 210 may be implemented in a single application-specific integrated circuit, ASIC, with photodetection signal path circuitry and a system controller, or it may be partitioned across more than one integrated circuit. It is important to note that the blink detection system of the present disclosure has broader uses than for vision diagnostics, vision correction and vision enhancement. These broader uses include utilizing blink detection as a means to control a wide variety of functionality for individuals with physical disabilities.

The same reasoning can apply to sensors for detecting the presence and locations of objects; namely, emitter-detector pairs, and pupil dilation sensors. All of these sensor readings may be utilized as signals or values for a control protocol to be implemented by various systems incorporated into an electronic or powered Ophthalmic Lens.

Figure 2B:
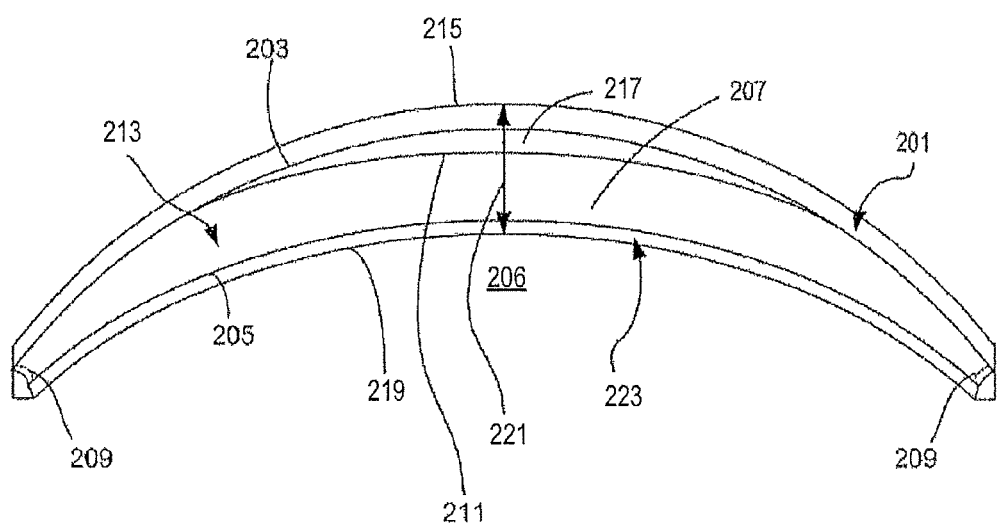
FIG. 2B illustrates a cross section of an exemplary liquid meniscus lens according to some aspects of the present disclosure.

Referring now to FIG. 2B, a cut away view of a liquid meniscus lens 206 with a front curve lens 201 and a back curve lens 223. The front curve lens 201 and the back curve lens 223 can be positioned proximate to each other and form an arcuate cavity 213 therebetween. The front curve lens includes a concave arcuate interior lens surface 203 and a convex arcuate exterior lens surface 215. The concave arcuate lens surface 203 may have one or more coatings (not illustrated). Coatings may include, for example, one or more of electrically conductive materials or electrically insulating materials, hydrophobic materials or hydrophilic materials. One or both of the arcuate lens surface 203 and the coatings are in liquid and optical communication with an oil 217 contained within the cavity 213.

The back curve lens 223 includes a convex arcuate interior lens surface 205 and a concave arcuate exterior lens surface 219. The convex arcuate lens surface 205 may have one or more coatings (not illustrated). Coatings may include, for example, one or more of electrically conductive materials or electrically insulating materials, hydrophobic materials or hydrophilic materials. At least one of the convex arcuate lens surface 205 and the coatings are in liquid and optical communication with a saline solution 207 contained within the cavity 213. The saline solution 207 can include one or more salts or other components which are electrically conductive and as such may be either attracted to or repulsed by an electric charge.

According to the present invention, an electrically conductive coating 209 is located along at least a portion of a periphery of one or both of the front curve lens 201 and the back curve lens 202. The electrically conductive coating 209 may include gold or silver and is preferably biocompatible. Application of an electrical charge to the electrically conductive coating 209 creates either an attraction or a repulsion of the electrically conductive salts or other components in the saline solution.

The front curve lens 201 has an optical power in relation to light passing through the concave arcuate interior lens surface 203 and a convex arcuate exterior lens surface 215. The optical power may be 0 or may be a plus or minus power. In some preferred embodiments, the optical power is a power typically found in corrective contact lenses, such as, by way of non-limiting example, a power between −8.0 and +8.0 diopters.

The back curve lens 223 has an optical power in relation to light passing through the convex arcuate interior lens surface 205 and a concave arcuate exterior lens surface 219. The optical power may be 0 or may be a plus or minus power. In some embodiments, the optical power is a power typically found in corrective contact lenses, such as, by way of non-limiting example, a power between −8.0 and +8.0 diopters.

Various embodiments may also include a change in optical power associated with a change in shape of a liquid meniscus 211 formed between the saline solution 207 and the oil 217. In some embodiments, a change in optical power may be relatively small, such as, for example, a change of between 0 to 2.0 diopters of change. In other embodiments, a change in optical power associated with a change in shape of a liquid meniscus may be up to about 30 or more diopters of change. Generally, a higher change in optical power associated with a change in shape of a liquid meniscus 211 is associated with a relatively thicker lens thickness 221.

According to some embodiments of the present invention, such as those embodiments that may be included in an ophthalmic lens, such as a contact lens, a cross cut lens thickness 221 of an arcuate liquid meniscus lens 206 will be up to about 1,000 microns thick. An exemplary lens thickness 221 of a relatively thinner Ophthalmic Lens 200 may be up to about 200 microns thick. Preferred embodiments may include a liquid meniscus lens 206 with a lens thickness 221 of about 600 microns thick. Generally a cross cut thickness of front curve lens 201 may be between about 35 microns to about 200 microns and a cross cut thickness 221 of a back curve lens 202 may also be between about 35 microns and 200 microns.

According to the present invention, an aggregate optical power is an aggregate of optical powers of the front curve lens 201 the back curve lens 223 and a liquid meniscus 211 formed between the oil 217 and the saline solution 207. In some embodiments, an optical power of the Ophthalmic Lens 200 will also include a difference in refractive index as between one or more of the front curve lens 201, the back curve lens 223, oil 217 and the saline solution 207.

In those embodiments that include an arcuate liquid meniscus lens 206 incorporated into an Ophthalmic Lens 200, it is additionally desirous for the saline 207 and oil 217 to remain stable in their relative positions within the curved liquid meniscus lens 200 as a contact wearer moves. Generally, it is preferred to prevent the oil 217 from floating and moving relative to the saline 207 when the wearer moves, accordingly, an oil 217 and saline solution 207 combination is preferably selected with a same or similar density. Additionally, an oil 217 and a saline solution 207 preferably have relatively low immiscibility so that the saline 217 and oil 208 will not mix.

In some preferred embodiments, a volume of saline solution 207 contained within the cavity 213 is greater than the volume of oil 217 contained within the cavity 213. Additionally, some preferred embodiments include the saline solution 207 in contact with essentially an entirety of an interior surface 205 of the back curve lens 223. Some embodiments may include a volume of oil 217 that is about 66% or more by volume as compared to an amount of saline solution 207. Some additional embodiments may include an arcuate liquid meniscus lens wherein a volume of oil 217 that is about 90% or less by volume as compared to an amount of saline solution 207.

Figure 3:
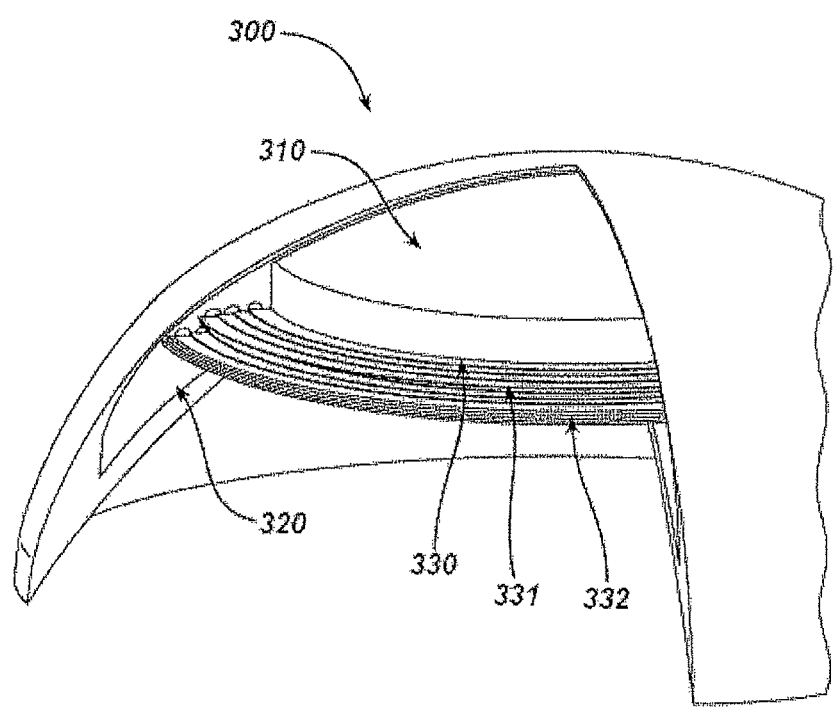
FIG. 3 illustrates a three dimensional cross section representation of an exemplary functionalized layered media insert that can be implemented according to some aspects of the present disclosure.

Referring now to FIG. 3 a three dimensional cross section representation is illustrated of yet another exemplary Ophthalmic Lens 300 including a Functionalized Layer Media Insert 320 configured to include a variable arcuate shaped liquid meniscus lens 310 with energization and electronic components on one or more of its layers 330, 331, 332. In the present exemplary embodiment, the Media Insert 320 surrounds the entire periphery of the Ophthalmic Lens 300. One skilled in the art can understand that the Media Insert 320 implemented may comprise a full annular ring or other shapes that still may reside inside or on the hydrogel portion of the Ophthalmic lens 300 and be within the size and geometry constraints presented by the ophthalmic environment of the user.

Layers 330, 331 and 332 are meant to illustrate three of numerous layers that may be found in a Media Insert 320 formed as a stack of functional layers. In some embodiments, for example, a single layer may include one or more of: active and passive components and portions with structural, electrical or physical properties conducive to a particular purpose including the energization, programming, and control functions described in the present disclosure. For example, in some embodiments, a layer 330 may include an Energy Source, such as, one or more of: a battery, a capacitor and a receiver within the layer 330. Item 331 then, in a non-limiting exemplary sense may comprise microcircuitry in a layer that detects actuation signals for the Ophthalmic Lens 300. In some embodiments, a power regulation layer 332, may be included that is capable of receiving power from external sources, charges the battery layer 330 and controls the use of battery power from layer 330 when the Ophthalmic Lens 300 is not in a charging environment. The power regulation may also control signals to an exemplary active arcuate shaped liquid meniscus lens 310 in the center annular cutout of the Media Insert 320.

An energized lens with an embedded Media Insert 320 may include an energy source, such as an electrochemical cell or battery as the storage means for the energy and in some embodiments, encapsulation, and isolation of the materials comprising the energy source from an environment into which an Ophthalmic Lens is placed. In some embodiments, a Media Insert 320 can also include a pattern of circuitry, components, and energy sources. Various embodiments may include the Media Insert 320 locating the pattern of circuitry, components and Energy Sources around a periphery of an Optic Zone through which a wearer of an Ophthalmic Lens would see, while other embodiments may include a pattern of circuitry, components and Energy Sources which are small enough to not adversely affect the sight of the Ophthalmic Lens wearer and therefore the Media Insert 320 may locate them within, or exterior to, an Optical Zone.

Figure 4:
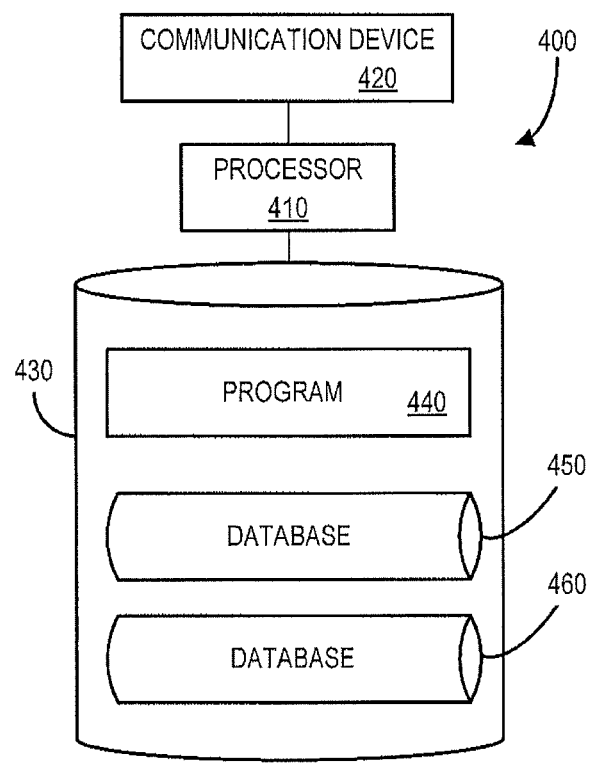
FIG. 4 illustrates a processor that may be used to implement some embodiments of the disclosure.

Referring now to FIG. 4, a schematic diagram of an exemplary system controller 400 that may be used with some embodiments of the present disclosure is illustrated. The system controller 400 includes a processor 410, which may include one or more processor components coupled to a communication device 420. In some embodiments, a system controller 400 can be used to transmit energy to the energy source placed in the Ophthalmic Lens.

The system controller 400 can include one or more processors 410, coupled to a communication device 420 configured to communicate logical electrical signals via a communication channel. The communication device 420 may be used, for example, to electronically control one or more of: the change of state of the arcuate shaped liquid meniscus lens, actuation of an electrical component, recording of sensor data, programming and execution of operational protocols, and the transfer of commands to operate a component.

The communication device 420 may also be used to communicate, for example, with one or more wireless user interface device, metrology device, and/or manufacturing equipment components. The system processor 410 is also in communication with a storage device 430. The storage device 430 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 430 can store a program 440 for controlling the processor 410. The processor 410 performs instructions of the program 440, and thereby operates in accordance with the present disclosure. For example, the processor 410 may transmit data including, for example, unique identifier, sensor data, calibration data, operational protocols, user information and other data that can be included for the operation of the ophthalmic lens and/or, in some embodiments, to generate a user profile. Accordingly, the storage device 430 can also store ophthalmic related data in one or more databases 450-460.

Figure 5:
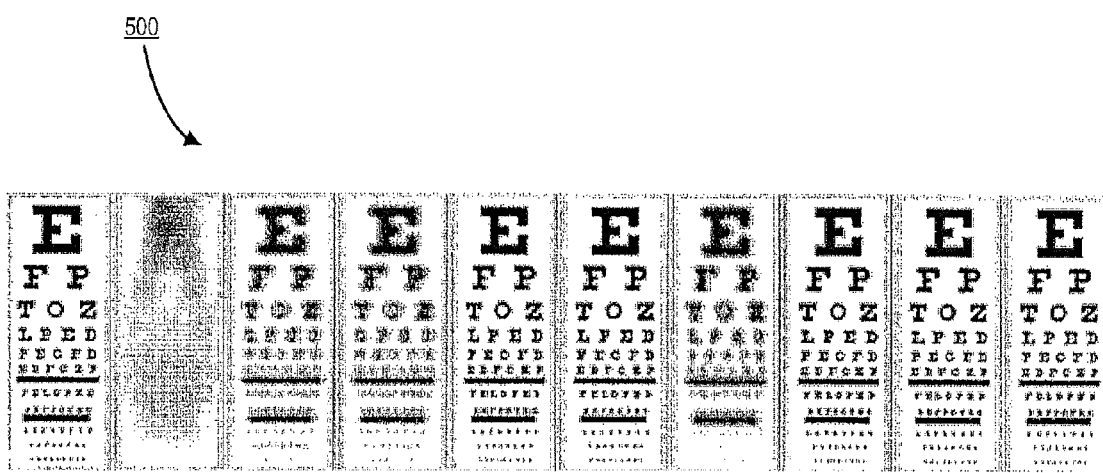
FIG. 5 is a representative display of a simulation of vision correction for a given patient according to aspects of the present disclosure.

Referring now to FIG. 5 a representative display of a simulation 500 of vision correction for a given patient is illustrated. In particular, FIG. 5 is a simulated Snellen chart that is generated to show a patient the vision correction options available to him/her using lens design data. Information regarding a patient's bare eye data is provided; and two or more available vision options are selected and displayed. The patient can select based on need and preference. In certain embodiments of the present invention, the basic steps of requesting information from a patient and selecting an appropriate option are performed in a substantially continuous, interactive process.

For example, a store display could be equipped with an interactive computer which can prompt the user to answer questions, keep track of the answers, provide new questions and/or selections based upon the answers provided, and select an appropriate classification based on those answers as described above. In alternative embodiments, the information may be collected from a patient though the use of an interactive site on the World Wide Web, an interactive menu-driven phone system, and the like. Charts, tables or other figures may be used as devices for requesting information from a patient and taking the patient through the preference process as described above. Similarly, charts, figures, and the like, can be distributed via e-mail, or via a network such as the World Wide Web, and the like.

It is also possible for information regarding the selection of vision correction options in accordance with the methods of the present invention to be distributed to eye care practitioners, merchants, or other persons and/or places likely to be engaged in the recommendation, retail sale, promotion, distribution, giveaway, or trade of eye care products. The interaction described in the present application could take place between a patient, a patient's caretaker, a patient's parent, a patient's eye care practitioner, merchant, or other person engaged in the sale of eye care products. Further, selection may occur proximate to a display case containing one or more of the vision correction options available within each of any available classifications.

Figure 6:
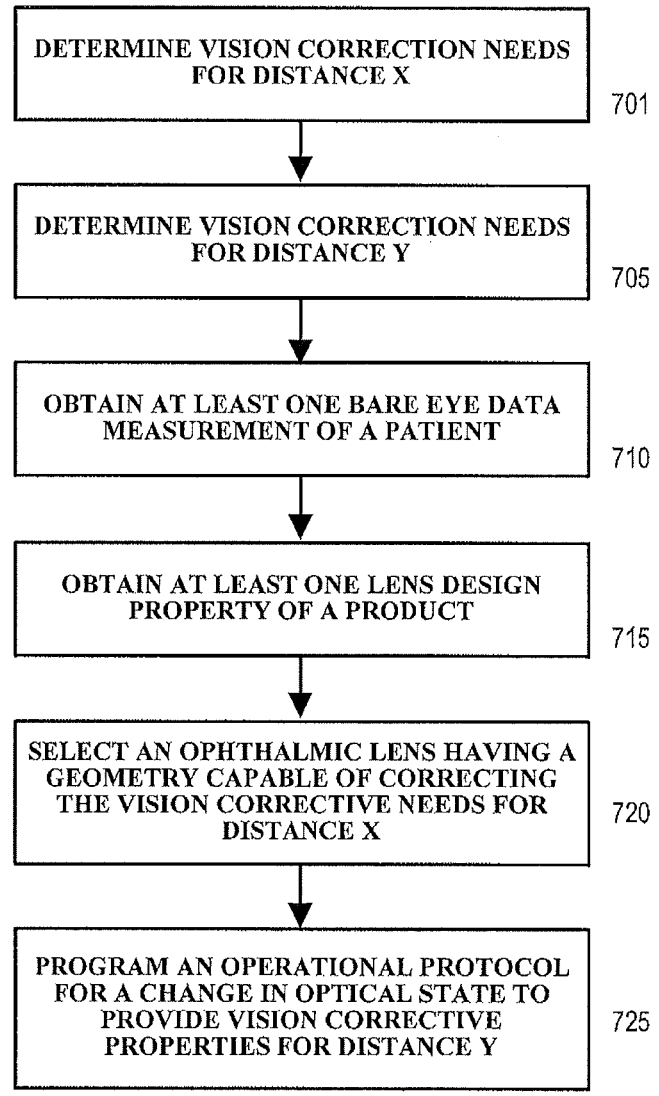
FIG. 6 illustrates method steps that may be used to program a multi-focal ophthalmic lens of the system of the present disclosure.

Referring now to FIG. 6, a flow chart illustrating method steps that may be used to program a multi-focal ophthalmic lens of the system of the present disclosure are depicted. At step 701, an eye examination of a patient using vision simulation interactive software can take place to determine the vision correction needs for a patient at a first distance X. During the same eye examination of step 701 or in a different type of examination, at step 705, vision correction needs of the patient also using vision simulation interactive software can be determined for a second distance Y. At step 710, Bare Eye Data or measurements may be obtained during one or more examinations. Eye examinations can include, for example, a Topographical Exam, Wavefront Exam, and/or Physiology Exam. The examinations may include one or a combination of: Software Based, Store Based, and Web-based data collection methods.

At step 715, at least one lens design option of an available product is obtained. Lens design options may include, for example, geometrical shapes for fit, optical properties, functional components, Mechanical Choices, and the like. Said obtained lens design option may be implemented by the vision simulation software to provide the visual simulations according to the option(s) selected. Visual simulations may be provided to the patient as a simulated display of graphical representations predicting the optical effect for one or more lens design options available for that patient.

At step 720, an ophthalmic lens may be selected that is capable of correcting the vision correction needs of the patient for a distance X. According to the selected ophthalmic lens, at step 725, an operational protocol for a change in optical state of the arcuate shaped liquid meniscus lens to provide vision corrective properties for distance Y is programmed. The protocol can be executed according to an activation signal. The activation signal which may be triggered, for example, according to blink detection system previously described. In addition, in some embodiments one state may not include any vision correcting optical properties. For example, only near sight correction properties may be programmed in the Ophthalmic Lens at a first state and no vision correction can occur at the second state. This can be useful for users that only require vision correction for either near sight or distance sight.

The invention claimed is:

1. A method of programming an energized ophthalmic lens for providing by-focal vision correction, the method comprising:
    determining vision corrective needs of a user for distance X;
    determining vision corrective needs of a user for distance Y;
    obtaining at least one bare eye data measurement of the patient and one or more lens design options for the at least one bare eye data measurement of the patient;
    providing a simulated display of graphical representations predicting the optical effect of said one or more obtained lens design options;
    selecting from the simulated display an ophthalmic lens comprising a hydrogel supporting structure and a media insert, at least a portion of the media insert being supported by the hydrogel portion, and positioned onto a portion of the optical zone of the ophthalmic lens, the optical options of the ophthalmic lens providing an optical effect capable of correcting the vision at a distance X; and
    programming an operational protocol to switch the state of the optical corrective properties of the lens for an image at distance Y.

2. The method of claim 1, wherein:
    said at least one bare eye data measurement is taken at location selected from the group consisting of a practitioner's office, at a retail store, at a kiosk, at a vehicle, at a patient's workplace and at a patient's home.

3. The method of claim 1, wherein:
said at least one bare eye data measurement includes at least one of a topographical exam, wavefront exam, or physiology exam.

4. The method of claim 1, wherein:
said at least one bare eye data measurement includes one or a combination of: software-based, store-based, and web-based data collection methods.

5. The method of claim 1, wherein:
said and one or more lens design options are based on at least one of geometrical shapes for fit, optical properties, functional components, and mechanical choices and is at least partially defined by said at least one bare eye data measurement.

6. The method of claim 1, wherein:
said media insert comprises a liquid meniscus lens.

7. The method of claim 6, wherein:
wherein said operational protocol switches the curvature of the meniscus within said liquid meniscus lens.

8. The method of claim 1, further comprising:
executing the operational protocol according to an activation signal.

9. The method of claim 8, wherein:
said activation signal is triggered by a blink detection system.

10. The method of claim 1, wherein:
one state of the lens does not include any vision correction properties.

11. The method of claim 1, wherein:
the simulated display of graphical representations corresponds to an anticipated optical performance resulting from the change of the shape of a liquid meniscus of a arcuate liquid meniscus lens.

12. The method of claim 1, further comprising: sending one or both of user's feedback and measurement refraction examination information to an eye care practitioner.

13. A method of programming an energized multi-focal ophthalmic lens, the method comprising:
providing a simulated display of graphical representations predicting an optical effect of one or more optical properties by the lens;
receiving data based on the simulated display of the graphical representations; and
programming an operational protocol to switch the state of the optical effect of the lens based on the data.

14. The method of claim 13, further comprising:
correlating the optical effect from the simulated display of graphical representations with the optical effect of the lens at predetermined distances.

15. The method of claim 14, wherein:
the state of the optical effect of the lens corrects vision at said predetermined distances.

16. The method of claim 13, further comprising:
obtaining at least one bare eye data measurement.

17. The method of claim 16, wherein:
the programming of the operational protocol is based on the data and the at least one bare eye data measurement.

18. The method of claim 13, wherein:
the lens comprises a liquid meniscus.

19. The method of claim 18, wherein:
the optical effect of the lens is based on the curvature of the liquid meniscus.

20. The method of claim 19, wherein:
the operational protocol switches the curvature of the liquid meniscus.

* * * * *